July 8, 1952 — G. W. JOHNSON — 2,602,419
COMBINED HOG FARROWING CRATE, HOUSE, AND FEEDER
Filed Sept. 24, 1949 — 3 Sheets-Sheet 1

INVENTOR,
Gordon W. Johnson.
BY Roy E. Hamilton,
Attorney.

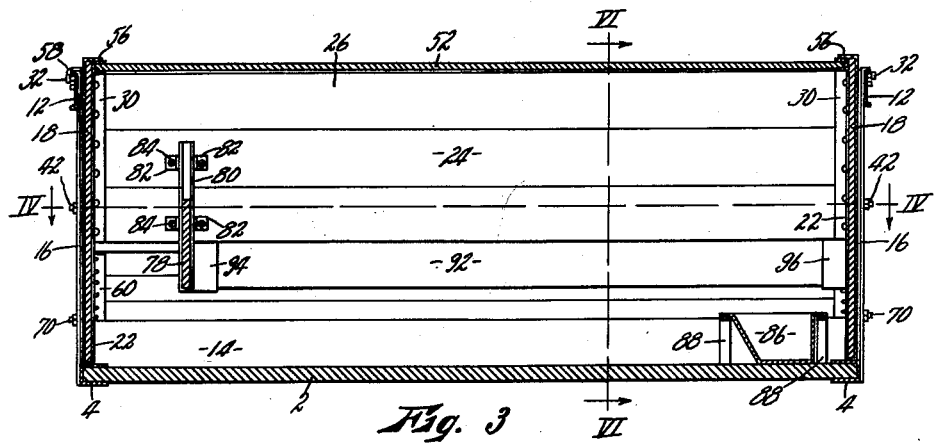
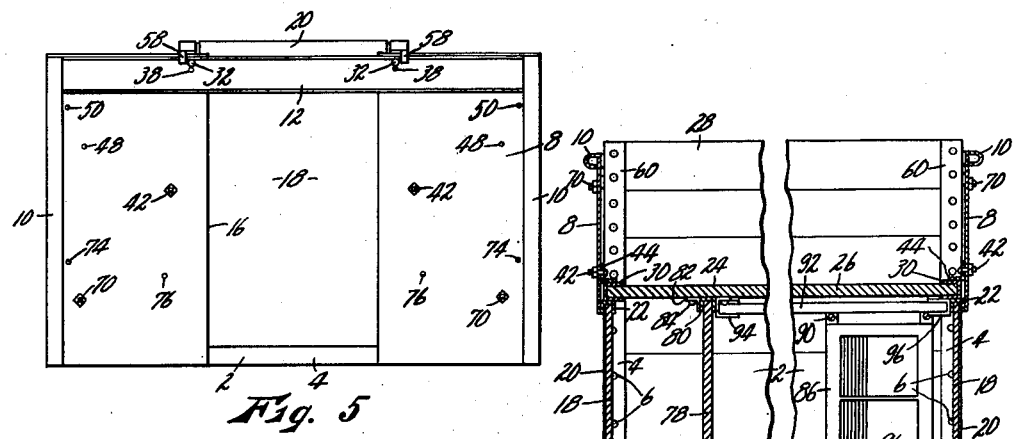
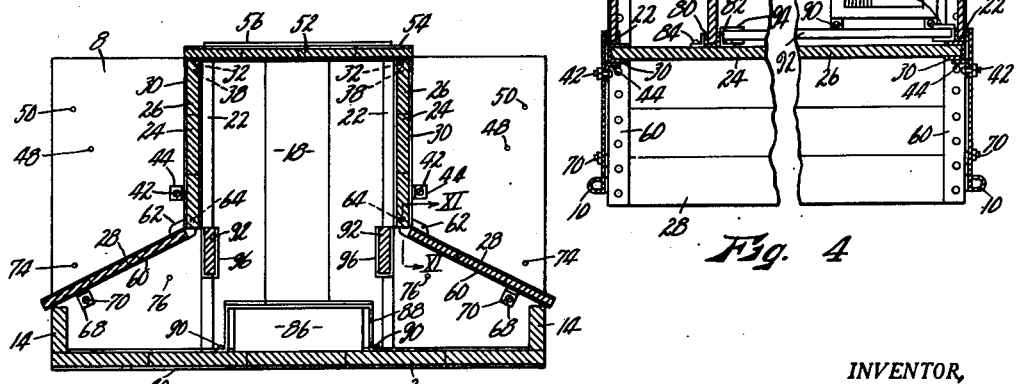

July 8, 1952　　　　G. W. JOHNSON　　　　2,602,419
COMBINED HOG FARROWING CRATE, HOUSE, AND FEEDER
Filed Sept. 24, 1949　　　　　　　　　　　　3 Sheets-Sheet 3

INVENTOR,
Gordon W. Johnson
BY Roy E. Hamilton
Attorney.

Patented July 8, 1952

2,602,419

UNITED STATES PATENT OFFICE 2,602,419

COMBINED HOG FARROWING CRATE, HOUSE, AND FEEDER

Gordon W. Johnson, Raytown, Mo., assignor to Gordon Johnson Company, Kansas City, Mo., a corporation of Missouri Application September 24, 1949, Serial No. 117,675

7 Claims. (Cl. 119—16)

This invention relates to new and useful improvements in devices for the handling and care of hogs, and has particular reference to hog farrowing crates, houses and feeders.

The principal object of the present invention is the provision of a device of the character described comprising a box-like enclosure having certain of its walls movable and adapted to be positioned to form selectively a hog farrowing crate, house, or feeder.

Another object is the provision in a device of the character described, of a hog farrowing crate having a central portion of great enough height to accommodate a sow and laterally extending portions of a height sufficiently small to prevent the entry of the sow, said side portions being adapted to accommodate the newborn pigs to prevent the sow from killing them by lying or rolling on them.

A further object is the provision, in a hog farrowing crate of the character described, of means for adjusting the height of the entry to said side portions, whereby the crate may be adapted for use by sows of different sizes.

Other objects are simplicity and economy of construction, ease and convenience of adjustment of the device for its various uses, easy access to any portion of the interior of the device, the provision of insulating walls to permit use of the device in cold weather, and adaptability for use as a sun shade in hot weather.

With these objects in view, as well as other objects which will appear in the course of the specification, reference will be had to the drawing, wherein:

Fig. 3 is a sectional view taken on line III—III of Fig. 2.

Fig. 4 is a foreshortened horizontal section on an enlarged scale taken on line IV—IV of Fig. 3.

Fig. 5 is a left-end elevation of the device as shown in Fig. 1.

Fig. 6 is a sectional view taken on line VI—VI of Fig. 3.

Figure 1:
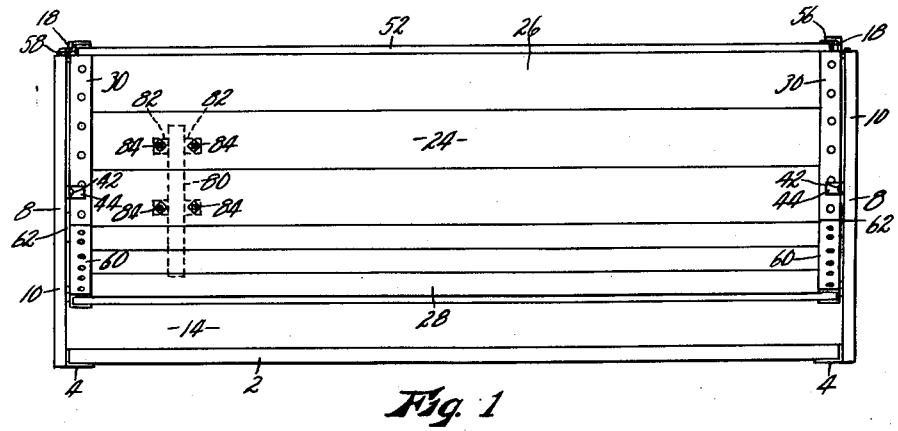
Figure 1 is a side elevational view of a combined hog farrowing crate, house, and feeder embodying the present invention, with the parts thereof positioned to form a hog farrowing crate.

Like reference numerals apply to similar parts throughout the several views, and the numeral 2 applies to a planar rectangular floor. Said floor and also the side walls, cover, and end doors hereinafter described, may be of any suitable material, but wooden boards or planking is preferred, both for its economy and for its heat insulating properties, which permits the device to be used effectively in cold weather. The planks forming the floor 2 are bound along each end thereof by a sheet metal channel 4, secured to said planks by any suitable means such as rivets 6.

A sheet metal end-wall 8, rectangular in form, is secured along its lower edge to each of channels 4 by welding or other suitable fastening, and said end-walls extend the full width of floor 2. The vertical edge portions of said end-walls are rolled to form reinforcing beads 10, and each end-wall is reinforced along its upper edge by an outwardly opening channel 12 welded or otherwise rigidly secured to the outer surface of said end-wall along the upper edge thereof. Fixed along each longitudinal edge of floor 2, and extending between end walls 8 is a plank forming a short fixed side-wall 14.

Formed centrally in each of end-walls 8 is a door opening 16 extending from the top to the bottom of said end walls. Floor channels 4 and reinforcing channels 12 extend across said door opening and secure the side portions of said end walls in fixed relation. Said door openings are provided with closure doors 18, which may be formed of wooden boards and which are provided with sheet metal facings 20. Each of said doors is carried for vertical sliding movement in a pair of confronting channels 22 welded to the inner surface of end-wall 8 at the vertical edges of door openings 16. Channels 22 also serve to reinforce said end walls adjacent the doors.

Figure 7:
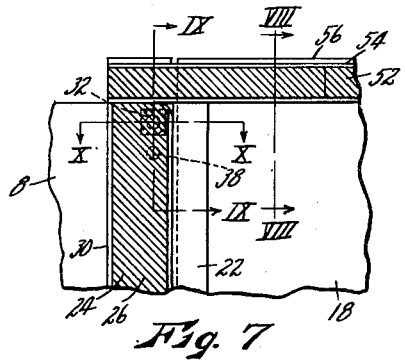
Fig. 7 is an enlarged fragmentary section taken on line VII—VII of Fig. 2.
Figure 8:
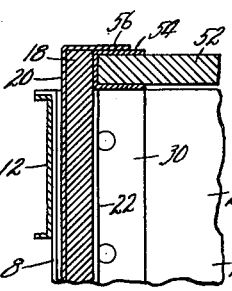
Fig. 8 is a fragmentary section taken on line VIII—VIII of Fig. 7.
Figure 9:
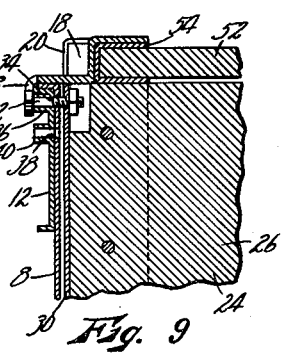
Fig. 9 is a fragmentary section taken on line IX—IX of Fig. 7.
Figure 10:
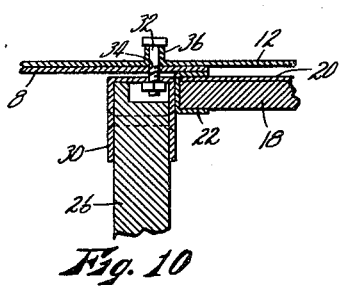
Fig. 10 is a fragmentary section taken on line X—X of Fig. 7.

A pair of transversely spaced-apart side-walls 24 extend longitudinally between end-walls 8 respectively at opposite sides of doors 16, each comprising an upper section 26 and a lower section 28 pivotally joined to said upper section. Each upper-wall section is preferably formed of horizontally disposed wooden boards bound at the ends with sheet metal channels 30, and is pivotally mounted to end walls 8 at its upper edge by two pivot bolts 32. Said bolts are disposed horizontally and coaxially, one at each end of the wall section 26, and each bolt passes respectively through the binding channel 30 of the wall section, through a hole 34 in end-wall 8 and channel 12, and a bearing sleeve 36, fixed to the outer surface of channel 12. Bolts 32 may be inserted also through holes 38, which are spaced vertically beneath holes 34, and which are provided with bearing sleeves 40, for a purpose hereinafter appearing. The construction of these pivotal joints best appears in Figs. 7, 9, and 10.

Figure 13:
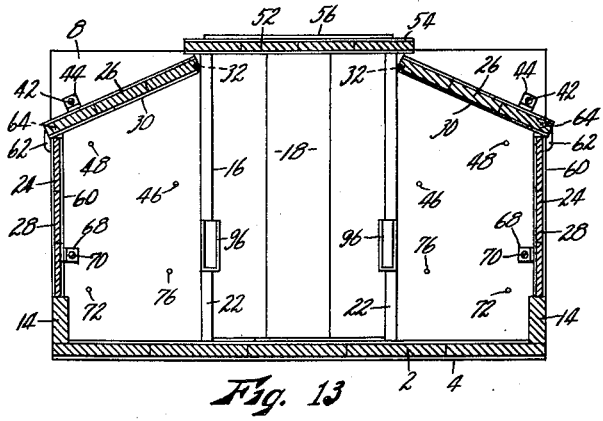
Fig. 13 is a view similar to Fig. 6, showing the walls of the device positioned to form a hog house.

Thus the upper side-wall sections 26 may be pivoted from a substantially vertical position against door channels 22, as shown in Fig. 6, outwardly to a position substantially as shown in Fig. 13. Each wall section 26 is adapted to be secured in any of a plurality of angular positions by means of bolts 42. A bracket 44 is welded or otherwise rigidly secured to each end of wall section 26 adjacent the free edge thereof, and a bolt 42 passes through said bracket and selectively through one of holes 46, 48, or 50 provided therefor in the adjacent end-wall 8.

Figure 2:
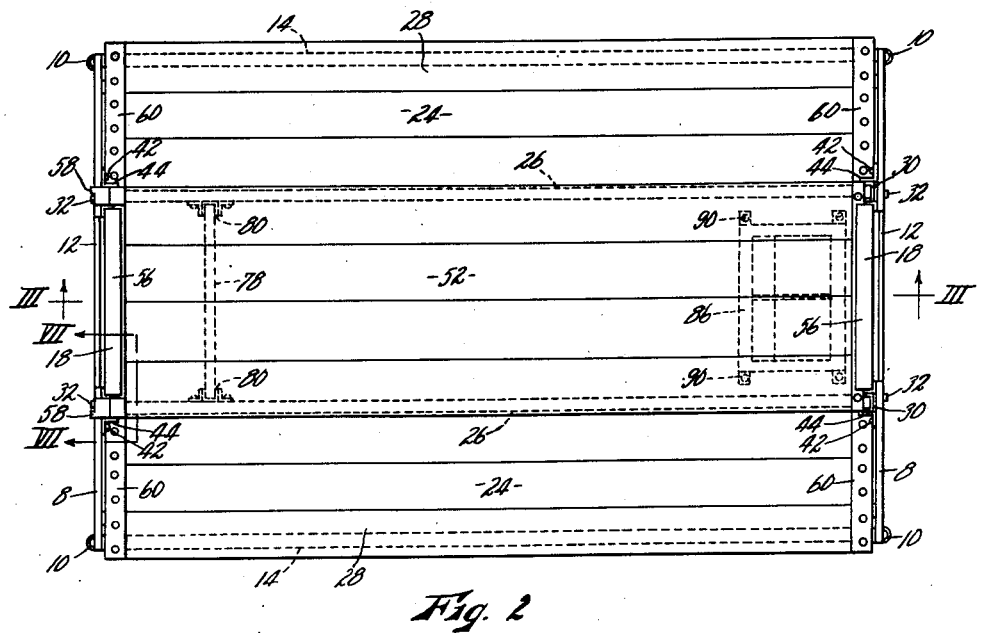
Fig. 2 is a plan view of the device.

A cover 52 comprising boards bound at the ends by channels 54 extends substantially the full length of the device and is of sufficient width to be supported on the upper edges of upper side-wall sections 26. End doors 18 extend upwardly to overlap the ends of said cover to prevent longitudinal movement thereof, and the metal facing 20 of each of said end doors is bent inwardly at its upper edge to form a flange 56 overlapping the upper surface of cover 52, thereby holding said cover down. At the left end of the device, as viewed in Figs. 1 and 2, a pair of longitudinally extending hooks 58 are secured to the corners of cover 52. Said hooks extend past the edges of door 18 and engage loosely the upper flange of channel 12. Said hooks prevent lateral movement of the cover, and form a hinge permitting pivotal raising of said cover.

Figure 11:
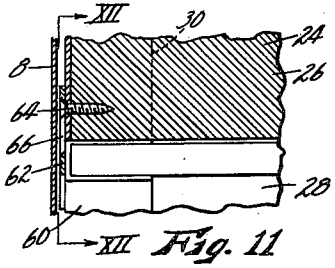
Fig. 11 is an enlarged fragmentary section taken on line XI—XI of Fig. 6.
Figure 12:
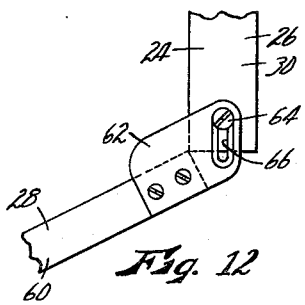
Fig. 12 is a fragmentary section taken on line XII—XII of Fig. 11.

Each lower side wall section 28 is comprised of wooden boards or other suitable material bound at the ends of sheet metal channels 60, and extends longitudinally between end walls 8. It is pivotally joined at its upper edge to the corresponding upper side-wall section 26 on an axis parallel to the pivotal axis of section 26. Said pivotal joint, best shown in Figs. 11 and 12, includes a pivot plate 62 secured rigidly to each end of wall section 28 at the upper edge thereof and overlapping the ends of wall section 26. A screw 64 passes through a slot 66 formed in said pivot plate, and is threaded firmly in wall section 26. Said slot is sloped in the plane of wall section 28 so that the crack between the wall sections 26 and 28 will always be closed, as will hereinafter appear. A bracket 68 is secured to each end of wall section 28 adjacent the free edge thereof, and a bolt 70 passes therethrough and selectively through one of holes 72, 74, or 76 formed in the adjacent end-wall 8.

When the device is to be used as a farrowing crate, pivot bolts 32 of the side walls 24 are inserted in holes 34, and upper side-wall sections 26 are pivoted to a substantially vertical position, as shown in Fig. 6, and secured there by inserting bolts 42 in holes 46 of the end-walls. Lower side-wall sections 28 are angled outwardly to rest on the upper edges of fixed side-walls 14, and secured in position by inserting bolts 70 in holes 72 of the end-walls 8. From Fig. 12 it will be noted that with the side-walls in this position, lower side-wall section 28 hangs with screws 64 in the upper ends of slots 66 in pivot plates 62, and there is virtually no crack between the upper and lower wall sections for the entry of cold weather. In use either end door 18 may be elevated and the sow herded into the space between the side walls. The newborn pigs may move into the relatively shallow spaces underneath the lower side-wall sections 28. Since these spaces are too shallow for the sow to enter, the pigs are thereby rendered safe from death or injury caused from being lain or rolled on by the sow. The sow is readily accessible through either end door 18 or through cover 52, and the pigs may be readily inspected or removed by raising wall sections 28 pivotally. If desired, bolts 70 securing wall sections in place may be omitted, and said wall sections will be held in place by gravity.

Further improvements in the farrowing crate which are desirable though not essential to the basic invention, include a back board 78 extending transversely between upper side-wall sections 26 adjacent one end of the device. The end portions of said board are disposed slidably in a pair of channels 80 disposed vertically and fixed respectively to the inner surfaces of wall sections 26 by brackets 82 and bolts 84. The board may be dropped into position in channels 80 after the sow has been driven into position. It prevents the sow from backing up, and provides a passage by which the pigs may pass from one side of the device to the other. Both the board and channels 80 are detached by removing bolts 84 when the device is to be used as a house or a feeder. A feed trough 86 for containing feed and water for the sow may be removably fixed to the floor 2 of the device adjacent the opposite end thereof, by means of brackets 88 and screws 90.

For use when the sow to be confined is so small that she could enter the spaces beneath lower wall sections 28, a pair of boards 92 are disposed respectively horizontally within the device parallel to side-walls 24 and at opposite sides of door openings 16. Each of said boards has one of its ends resting in a channel 94 fixed to channel 80 which carries back board 78, and its opposite end resting in a channel 96 fixed to one of the door channels 22 at the opposite end of the device. Channels 94 and 96 are closed at their lower ends and boards 92 rest therein by gravity. Boards 92 form in effect downward extensions of upper side-wall sections 26, but are spaced inwardly from said wall sections, as shown in Figs. 4 and 6, so that they may be freely lifted from channels 94 and 96 when they are not required.

When the device is to be used as a house, feed trough 86, boards 92, back board 78, and channels 80 are removed. Bolts 42 and 70 securing the side-wall sections in position are removed, and pivot bolts 32 are removed and reinserted in the lower holes 38 in the end-walls 8, and upper side-wall sections 26 are pivoted outwardly to the position shown in Fig. 13. It will be noted that pivot bolts 32 are disposed adjacent the inner surfaces of wall sections 26 at the upper edge thereof, so that when said wall sections are pivoted outwardly, the upper edges of the outer surfaces of said walls will be elevated. Hence by lowering the pivot bolts as described when the wall sections 26 are swung outwardly, the upper edges of the outer surfaces thereof will be maintained at approximately the same level, and thus will support the cover 52 properly and without tilting. This of course makes the device weather-tight to a greater extent. The lower side-wall sections are moved to a vertical position, with their lower edges resting on the upper edges of fixed side walls 14. Due to the slope of slots 66 in pivot plates 62, the outer edge portions of upper side-wall sections 26 will rest firmly against the upper edges of lower side-wall sections 28. Upper wall sections 26 are secured by inserting bolts 42 in holes 50 of the end walls, and lower wall sections 28 are secured by inserting bolts 70 in holes 74 of the end walls. The device is then adapted for use as a house suitable for hogs and pigs of a wide range of size. Access may be had thereto either through end doors 18 or cover 52. Ventilation in any desired amount, when the device is used either as a farrowing crate or as a house, may be provided either by raising doors 18 slightly, or by propping cover 52 open.

Figure 14:
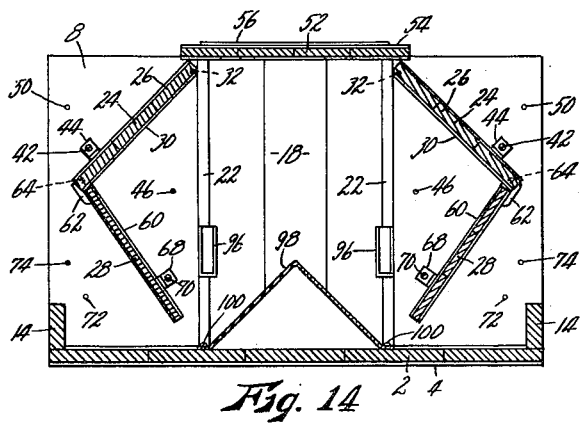
Fig. 14 is a view similar to Fig. 6, showing the walls of the device positioned to form a feeder.

When the device is to be used as a feeder, the upper side-wall sections are moved to a downwardly and outwardly divergent position, and the lower side-wall sections are moved to a downwardly and inwardly convergent position, as shown in Fig. 14, being secured in said positions by inserting bolts 42 in holes 48 of the end walls, and inserting bolts 70 in holes 76 of the end-walls. The lower edges of the lower side-wall sections are disposed in spaced relation above floor 2, and are spaced inwardly and downwardly from the upper edges of fixed side walls 14. Cover 52 may be removed and feed poured into the space between the side-walls. The feed will then flow by gravity out on floor 2 outside of side-walls 24, where it is accessible to animals feeding over the top of fixed side-walls 14. Walls 14 serve as lips preventing the feed from falling off the edge of the floor to the ground. A triangular sheet metal rib 98 may be secured to floor 2 along the midline thereof, and removably fixed thereto by means of screws 100. Said rib extends substantially the full length of the device, and serves to direct the feed outwardly toward the side walls.

Thus a device having great utility has been provided. A farmer having a plurality of these devices can use all of them as farrowing crates at farrowing time, and convert them to houses and feeders as the pigs grow older and the sows are taken away. The device is substantially weather-tight when used as a farrowing crate or a house, though it may be ventilated at will. The wooden walls provide good insulation against cold. In hot weather the side-walls can be extended horizontally and secured by any suitable means to form a sun shade. The end-walls and end fittings of the cover, side-walls, and floor may be shipped separately in a small space, and the lumber cut to fit on location, thereby affecting a valuable economy.

While I have shown a specific form of my invention, it is apparent that many minor variations of construction and operation could be made without departing from the spirit of the invention.

What I claim is:

1. A device of the character described comprising an elongated floor, upright end-walls fixed along their lower edges to the ends of said floor, short, fixed side-walls extending between said end-walls and extending upwardly from the edges of said floor, a pair of spaced-apart movable side-walls extending between said end-walls, each of said movable side-walls comprising an upper section pivoted at its upper edge to said end-walls on an axis parallel to and spaced inwardly from the corresponding edge of said floor and a lower section pivotally attached at its upper edge to the lower edge of its upper section on an axis parallel to said floor, the pivot of each upper side-wall section being disposed adjacent the inner surface thereof whereby the upper edge of the outer surface of each upper wall section will be elevated when said upper wall section is swung outwardly from a vertical position, said pivot being adjustable downwardly so that said upper edge of the outer surface of said upper wall section will remain substantially at the same elevation when said upper wall section is swung outwardly, a cover pivoted at one end to the upper edge of one of said end-walls and supported on the upper edges of said upper side-wall sections, and means for securing said upper and lower movable side-wall sections in fixed relation to said end walls.

2. A device of the character described comprising an elongated floor, upright end-walls fixed along their lower edges to the ends of said floor, short, fixed side-walls extending between said end-walls and extending upwardly from the edges of said floor, a pair of spaced-apart movable side-walls extending between said end-walls, each of said movable side-walls comprising an upper section pivoted at its upper edge to said end-walls on an axis parallel to and spaced inwardly from the corresponding edge of said floor and a lower section pivotally attached at its upper edge to the lower edge of said upper section on an axis parallel to said floor, the pivotal connection between said upper and lower side-wall sections being adjustable whereby said upper and lower wall sections will contact each other regardless of the relative position thereof, a cover, and means for securing said upper and lower side-wall sections in fixed relation to said end walls.

3. A device of the character described comprising a floor, opposite end-walls fixed along their lower edges to said floor, each of said end-walls having a door opening formed centrally therein, a vertically slidable closure door for each of said openings, respectively, a pair of spaced-apart parallel side-walls extending between said end-walls, each of said side-walls comprising an upper section pivoted at its upper edge to said end-walls on a horizontal axis disposed adjacent one side of said doors and a lower section pivoted at its upper edge to the lower edge of said upper side-wall section, means for securing said movable side-wall sections in various angular positions, and a cover extending substantially the length of the device and supported on the upper edges of said side-walls, each of said doors extending upwardly past the adjacent end of said cover and having a flange bearing against the upper surface of said cover.

4. In building construction, a pair of spaced, upright end walls; a pair of spaced side walls spanning the distance between the end walls, each side wall including a pair of sections articulated for relative swinging movement on a horizontal axis, the upper section of each side wall being pivotally mounted adjacent its uppermost edge for swinging movement on an axis parallel with said first-mentioned axis; and releasable means for securing said sections to the end walls in a number of selected positions with the sections of each side wall angularly displaced relatively and at differing angles.

5. In building construction, a pair of spaced, upright end walls; a pair of spaced side walls between the end walls, each including an upper section pivoted at its uppermost edge to the end walls and a lowermost section pivoted at its uppermost edge to the lowermost edge of the upper section, the upper sections being swingable on the pivots thereof to and from a vertical position; means securing the upper sections to the end walls in any one of a number of selected positions along the swinging paths of travel thereof, the lower sections being swingable relative to the upper sections; and means securing the lower sections to the end walls in any one of a number of selected positions angularly displaced relative to the corresponding upper section.

6. In building construction, a pair of spaced, upright end walls; a pair of spaced side walls, each including an upper section pivotally mounted at the uppermost edge thereof to the end walls in spaced relationship to corresponding vertical edges of the end walls for outward swinging movement on a horizontal axis away from a normal vertical position, and a lower section depending from the upper section and hingedly secured thereto for free swinging movement on a horizontal axis; releasable means for each upper section respectively for securing the same to the end walls in a number of selected positions throughout the path of travel thereof, including said normal vertical position; and releasable means for each lowermost section respectively for securing the same in a number of selected positions along the swinging path of travel thereof extending laterally from the corresponding upper section on either of two sides thereof.

7. In building construction, a pair of spaced, upright end walls; a pair of spaced side walls spanning the distance between the end walls and each having a normally vertical uppermost section; a top wall resting upon the uppermost edges of said uppermost side wall sections; and a pivot bolt at each end respectively of each of said side wall sections adjacent said uppermost edge thereof for pivotally mounting the same to the end walls, there being a number of corresponding openings for the pivot bolts and formed in the end walls for maintaining said uppermost edges in contact with said top wall upon swinging of the uppermost sections from the normal vertical position outwardly to selected angularly disposed positions.

GORDON W. JOHNSON.

REFERENCES CITED

The following references are of record in the file of this patent:

UNITED STATES PATENTS

| Number | Name | Date |
|---|---|---|
| 472,622 | Linkletter | Apr. 12, 1892 |
| 730,275 | Laswell | June 9, 1903 |
| 751,961 | Trone | Feb. 9, 1904 |
| 1,230,237 | Sturm | June 19, 1917 |
| 1,361,660 | Adix et al. | Dec. 7, 1920 |
| 1,439,157 | Ford | Dec. 19, 1922 |
| 1,920,563 | Kling | July 22, 1932 |